United States Patent [19]

Tanuma et al.

[11] Patent Number: 4,651,876
[45] Date of Patent: Mar. 24, 1987

[54] CASSETTE PROTECTIVE COVER

[75] Inventors: Yoshimi Tanuma; Hidetoshi Watanabe, both of Mooka, Japan

[73] Assignee: Columbia Magnetic Products Co., Ltd., Tochigi, Japan

[21] Appl. No.: 838,198

[22] Filed: Mar. 7, 1986

Related U.S. Application Data

[63] Continuation of Ser. No. 658,146, Oct. 5, 1984, abandoned.

[30] Foreign Application Priority Data

Dec. 8, 1983 [JP] Japan ............................ 58-188667[U]

[51] Int. Cl.4 ............................................. B65D 85/67
[52] U.S. Cl. .................................... 206/387; 206/459
[58] Field of Search ......................... 206/387, 425, 459

[56] References Cited

U.S. PATENT DOCUMENTS

| | | | |
|---|---|---|---|
| 3,495,716 | 2/1970 | Gregory | 206/387 |
| 3,635,350 | 1/1972 | Wolf | 206/387 |
| 3,746,180 | 7/1973 | Spiroch et al. | 206/387 |
| 4,119,200 | 10/1978 | Cassidy et al. | 206/387 |
| 4,272,167 | 6/1981 | Kempster | 206/387 |
| 4,304,331 | 12/1981 | Minkow | 206/387 |
| 4,385,693 | 5/1983 | Gelardi et al. | 206/387 |
| 4,496,048 | 1/1985 | Sykes | 206/387 |
| 4,501,359 | 2/1985 | Yoshizawa | 206/387 |

FOREIGN PATENT DOCUMENTS 2700556  1/1978  Fed. Rep. of Germany ...... 206/387

Primary Examiner—Joseph Man-Fu Moy
Attorney, Agent, or Firm—Murray Schaffer

[57] ABSTRACT

The present invention discloses a cassette protective cover for protecting a tape cassette of a so-called reel-to-reel type which has such a size that its thickness is substantially same as the maximum thickness of a tape cassette and which can protect a magnetic tape extended over an opening portion formed through the front surface of the tape cassette from being damaged and can be smoothly inserted into, for example, the breast pocket of a shirt.

9 Claims, 18 Drawing Figures

FIG. 3  FIG. 2
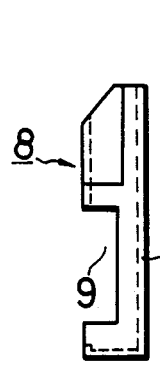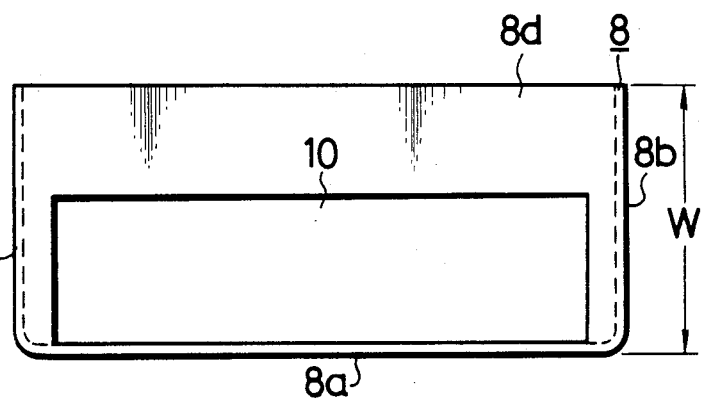
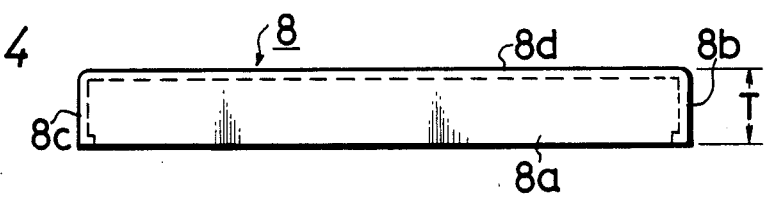
FIG. 4
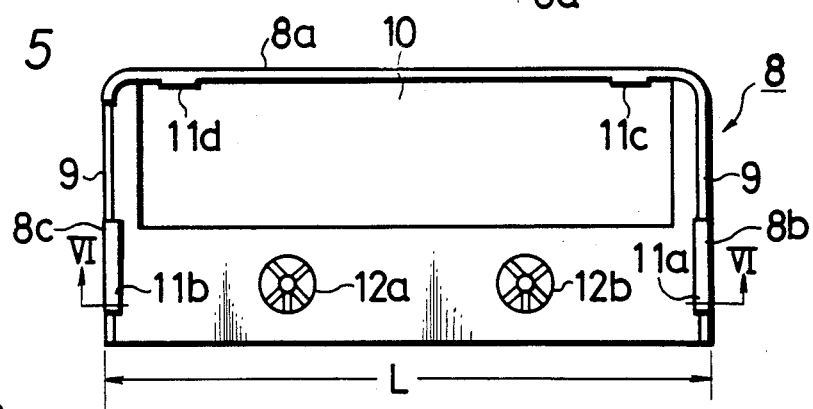
FIG. 5
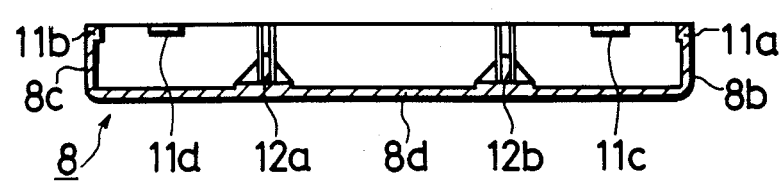
FIG. 6

CASSETTE PROTECTIVE COVER

This is a continuation of Ser. No.: 658,146 Filed: 10/05/84, now abandoned.

BACKGROUND OF THE INVENTION

1. Field of the Invention

The present invention generally relates to a cassette protective cover for protecting a tape cassette of a so-called reel-to-reel type and more particularly is directed to a cassette protective cover having a thickness substantially same as the maximum thickness of a tape cassette and which can easily be mounted on or dismounted from the tape cassette, thus improving a portability of the tape cassette

2. Description of the Prior Art

In order to protect a tape cassette, such a cassette receptacle container is known that is disclosed in the U.S. Pat. No. 3,272,325. In U.S. Pat. No. 3,272,325, a main part of the cassette receptacle container is constructed as follows.

The combination of a magnetic tape cartridge and storage container therefor comprises a first open receptacle container portion having a pair of side walls of equal length, an end wall connected with each said side wall at one end thereof, a bottom wall connected with said end wall and said side walls at one edge thereof, said bottom wall extending for only a portion of the length of said side walls defining a cut-away in said first receptacle portion whereby said side walls extend freely beyond said bottom wall; a second container portion having a lid wall substantially overlying said side walls over the entire length thereof in the closed position of said first and second container portions, a configured wall in spaced substantially parallel relation with said lid wall, said configured wall having the same shape as said cut-away and being dimensioned for closely fitting within said cut-away in the said closed position, additional lid wall means connected with both said lid wall and configured wall at the aligned edges thereof defining a pouch; a tape cartridge containing at least one tape reel, said cartridge positioned in said pouch, a major portion of said cartridge projecting beyond said configured wall, means hingedly connecting said first and second container portions for pivotal movement about an axis intersecting said side walls of said receptacle portion at the free ends thereof and passing through said pouch; and fixed means in said first open receptacle container portion locking said reel against rotation within said cartridge in the said closed position of the container portions. The above cassette receptacle container is dimensioned such that the length is 11 cm, the width 7 cm and thickness 1.8 cm. So, this cassette receptacle container is sensed too large to be inserted into, for example, the breast-pocket of a shirt and so on. On the other hand, when a tape cassette is used outdoors to enjoy a recorded musical program, in most case, a tape cassette is taken out from the above cassette receptacle container and then carried. In this case, there occur such troubles that dusts or the like enter the tape cassette through its opening portions and damages a magnetic tape therein and also that the magnetic tape stretched between a supply hub and a take-up hub is slackened and so on. In order to obviate this defect, such a tape cassette receptacle container has been proposed, which is disclosed in, for example, the published document of Japanese patent application examined, No. 40540/1975.

The outline of the published document of Japanese patent application examined, No. 40540/1975 will briefly be described with reference to FIG. 1.

In FIG. 1, reference numeral 1 generally designates an ordinary tape cassette of a so-called reel-to-reel type. This tape cassette 1 has two holes or apertures 2 through which a pair of drive shafts are inserted to drive a pair of hubs around which a magnetic tape is wound. The tape cassette 1 has through its front surface formed opening portions 3 through which the magnetic heads and so on are inserted to face the magnetic tape stretched between the supply hub and the take-up hub in the tape cassette 1. Swell portions 4 and 4a are respectively formed on upper, lower, right and left surfaces of the tape cassette 1. Reference numeral 5 designates a cassette receptacle container which consists of an upper plate 5a, a lower plate 5b and a rear plate 5c. The upper plate 5a and the lower plate 5b are both hingedly coupled to the rear plate 5c so as to freely open and close. Reference numerals 6a and 6b respectively designate cut-away portions which are formed through the upper and lower plates 5a and 5b at the positions corresponding to the upper and lower swell portions 4 of the tape cassette 1. Reference numerals 7a and 7b respectively designate engaging portions which are formed on the upper and lower plates 5a, 5b at the positions corresponding to the apertures 2 of the tape cassette 1. With this construction of the cassette receptacle container 5, the tape cassette 1 can be clamped in the cassette receptacle container 5 relatively compact in size. However, the tape cassette 1 can not be released from the cassette receptacle container 5 by one touch action, thus causing a problem when being used with a car tape recorder while a user is driving a vehicle. Also, there is a defect that the title of the tape cassette 1 can not be viewed until the upper and lower plates 5a, 5b are opened. In this case, if the title of the tape cassette 1 may be attached to the rear plate 5c of the cassette receptacle container 5, this defect could be solved. However, the tape cassette may frequently be inserted into the cassette receptacle container which has a title different from the title indicating the content of the tape cassette. In these cases, it is therefore desired that the title of the tape cassette can be viewed through the cassette receptacle container.

OBJECTS AND SUMMARY OF THE INVENTION

Accordingly, it is an object of the present invention to provide a cassette protective cover capable of preventing a cassette receptacle container from being increased in thickness more than swell portions of a tape cassette and which enables a tape cassette attached with this cassette protective cover to be inserted into an ordinary cassette receptacle container (cassette receptacle container disclosed in U.S. Pat. No. 3,272,325) in which one or two protrusions are removed and which can easily be mounted on or dismounted from the tape cassette by one touch action.

It is another object of the present invention to provide a cassette protective cover which can, upon carrying, prevent a tape in a tape cassette from being slackened.

It is still another object of the present invention to provide a cassette protective cover by which the tape winding state in a tape cassette can be inspected without removing the cassette protective cover.

It is yet another object of the present invention to provide a cassette protective cover in which through a bridging member constructing a part of the cassette protective cover is formed a window or a cut-away portion by which a tape winding state in the tape cassette can be inspected through its transparent window portion.

It is a further object of the present invention to provide a cassette protective cover in which its bridging member is formed of at least transparent material so that the tape winding state in the tape cassette can be inspected through its transparent window portion.

It is a still further object of the present invention to provide a cassette protective cover into which a tape cassette can be inserted only from its one side surface so that when the cassette protective cover is removed and the tape cassette is played, the surface of the tape cassette covered with the protective cover is always a surface A or surface B (major plane of a tape cassette which is usually called side A or side B), whereby not only operation property is improved but also very advantageous for the blind to recognize the side of the tape cassette as side A or side B.

It is a yet further object of the present invention to provide a cassette protective cover having engaging members which can be engaged with only engaging members provided on swell portions of right and left side walls of a tape cassette whereby the cassette protective cover can be inserted into the tape cassette half only in one direction.

It is a further object of the present invention to provide a cassette protective cover in which its bridging member is so formed that the cassette protective cover can be inserted into the tape cassette only in one surface direction.

It is a further object of the present invention to provide a cassette protective cover which is made of resilient material to thereby protect a tape cassette.

According to one aspect of the present invention, in a tape cassette in which a magnetic tape is wound around two reels and extended over the opening portion thereof, there is provided a cassette protective cover which comprises U-shape members for covering the tape opening portion and a part of right and left side wall portions and a bridging member for connecting the right and left side wall portions.

The other objects, features and advantages of the present invention will become apparent from the following description taken in conjunction with the accompanying drawings through which the like references designate the same elements and parts.

BRIEF DESCRIPTION OF THE DRAWINGS

FIG. 2 is a plan view of an embodiment of a cassette protective cover according to the present invention;

FIG. 3 is a side view thereof;

FIG. 4 is a front view thereof;

FIG. 5 is a bottom view thereof;

FIG. 6 is a cross-sectional view thereof taken along a line VI—VI in FIG. 5;

DESCRIPTION OF THE PREFERRED EMBODIMENTS

Now, the present invention will hereinafter be described in detail with reference to the drawings. FIGS. 2 to 6 are respectively diagrams showing an embodiment of a cassette protective cover according to the present invention.

Figure 1:
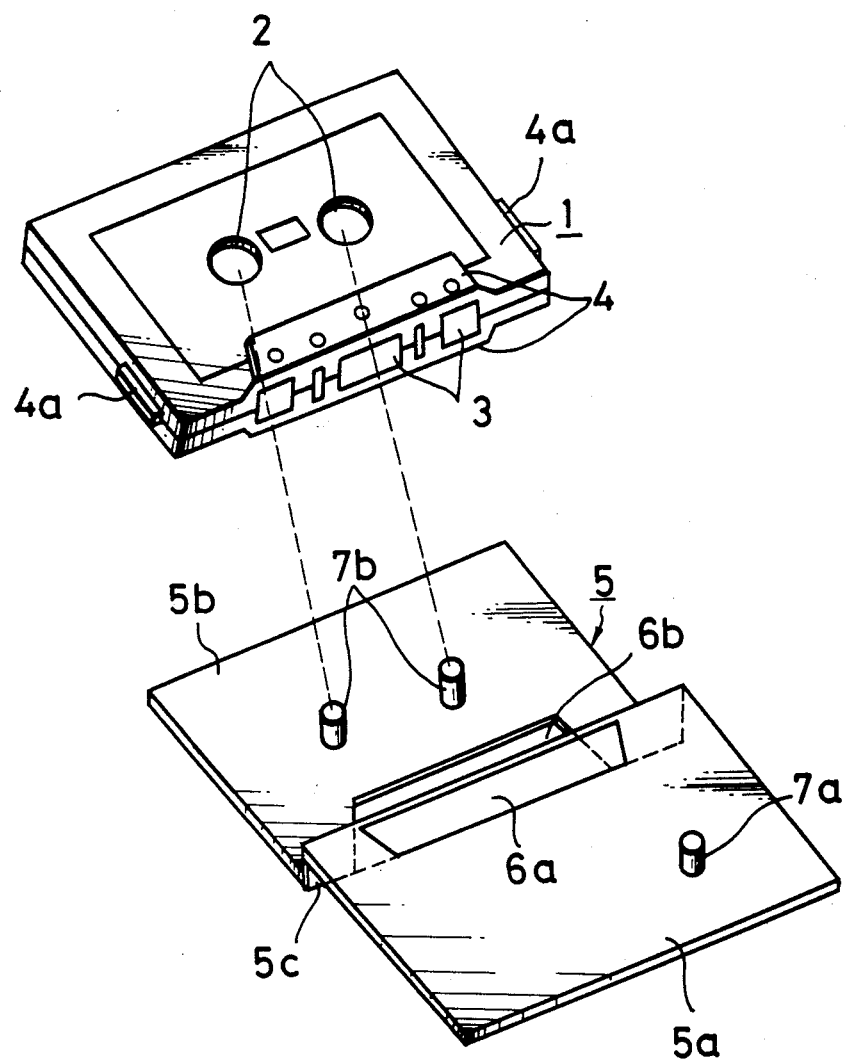
FIG. 1 is a perspective view showing a prior art tape cassette and its cassette receptacle container.
Figure 7:
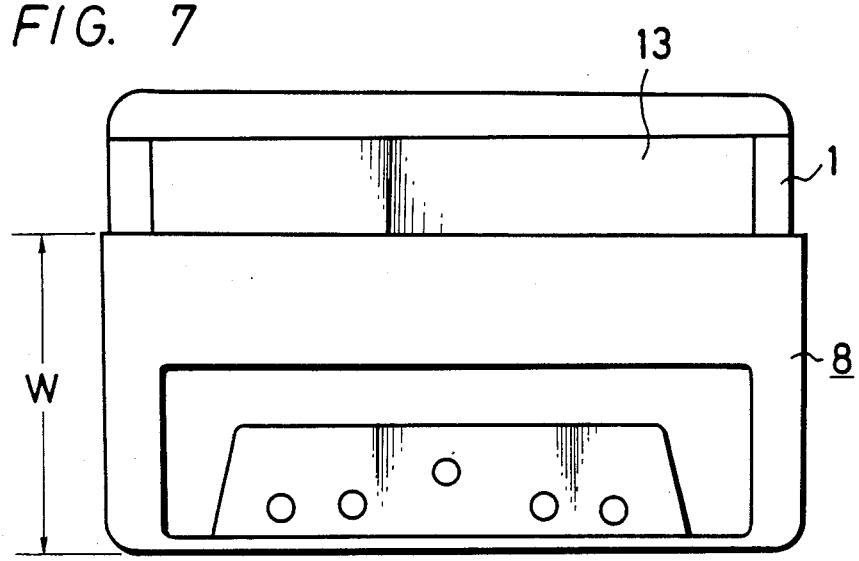
FIG. 7 is a plan view showing the cassette protective cover of the present invention which is attached to a tape cassette.
Figure 8:
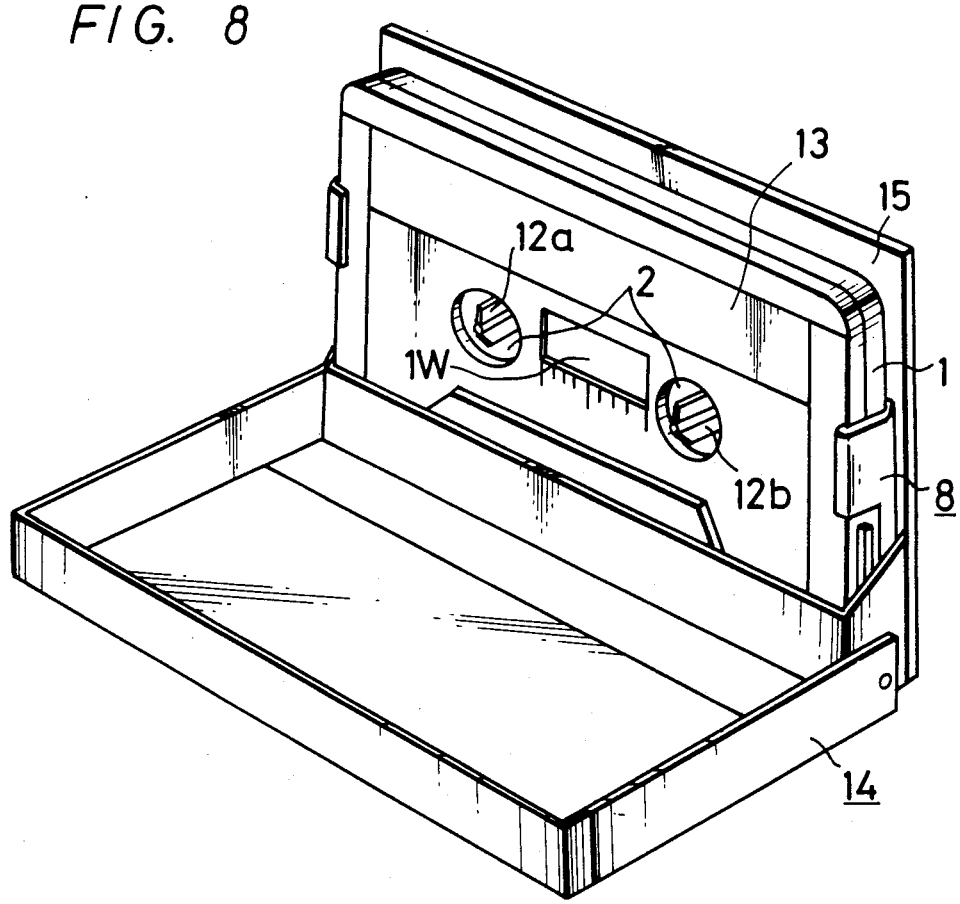
FIG. 8 is a perspective view illustrating a state in which the tape cassette, attached with the cassette protective cover of the present invention is inserted into an ordinary cassette receptacle container with no engaging members.

Throughout FIGS. 2 to 6, reference numeral 8 generally designates an embodiment of a cassette protective cover according to the present invention. The cassette protective cover 8 consists of a front plate 8a which covers the windows or openings 3 formed through the front portion of the tape cassette 1 (refer to FIG. 1) and right and left side plates 8b and 8c which are formed as a substantially U-shape. If necessary, a cut-away portion 9 is partially formed through each of the right and left side plates 8b and 8c. The cut-away portions 9 are both made to receive therein swell portions 4a formed on the left and right side walls of the tape cassette 1 shown in FIG. 1, respectively. Further, an upper plate 8d which connects the right and left side plates 8b, 8c at their upper edges is molded to be integral with the front plate 8a and the right and left side plates 8b, 8c of U-shape by synthetic resin and so on. Reference numeral 10 designates a cut-away portion formed through the upper plate 8d so as to receive therein the swell portion 4 which is formed on the upper surface of the tape cassette (FIG. 1). In the present invention, the cut-away portion 10 is formed as the rectangular aperture but the shape thereof may be formed in a desired one. Reference numerals 12a and 12b designate engaging members which are respectively formed on the inner surface of the upper plate 8d at predetermined positions and inserted into the apertures 2, 2 of the tape cassette 1 (refer to FIG. 1) so as to engage the supply and take-up hubs thereof. Reference numerals 11a, 11b, 11c and 11d respectively designate engaging nails which are formed on the inner surfaces of the side plates 8b, 8c and the front plate 8a and which are slightly engaged with the corner portions of the bottom surface of the tape cassette 1 to thereby clamp the cassette protective cover 8 to the tape cassette 1. In the cassette protective cover 8 of the present invention, the width W thereof is selected to be such that when the tape cassette 1 is inserted into the cassette protective cover 8, a label portion 13 of the tape cassette 1 can be directly seen from the outside as shown in FIG. 7. Also, the thickness T and the length L of the cassette protective cover 8 (refer to FIGS. 4 and 5) are respectively selected in such a manner that, as shown in FIG. 8, the tape cassette 1, which is in the state of being covered with the cassette protective cover 8, can be inserted into a lid portion 15 of an ordinary cassette receptacle container 14 in which the engaging members (refer to 12a, 12b in FIG. 10) are removed from the cassette receptacle container as disclosed in U.S. Pat. No. 3,272,325.

As shown in a plan view of FIG. 7, the cassette protective cover 8 of the present invention can be inserted into or released from the tape cassette 1 only from its major surface (surface A or B) so that the tape cassette 1 with the cassette protective cover 8, which is under the state as shown in FIG. 7, can be put into, for example, a breast pocket and so on. At this time, as compared with a case wherein the tape cassette 1 together with the cassette receptacle container 14 is put into the breast pocket, the tape cassette 1 with the cassette protective cover 8 can be very smoothly put into the breast pocket. When the tape cassette 1 is kept at home, it is possible to keep the tape cassette 1 with the cassette protective cover 8 being held within the cassette receptacle container as shown in FIG. 8.

According to the cassette protective cover 8 of the present invention, it is possible to provide various other advantages as follows. (a) It is possible to inspect the label portion of the tape cassette even with the cassette protective cover. (b) The cassette protective cover covers the tape opening portion of the tape cassette so that upon carrying, the tape can be prevented from being damaged and also protected from dusts. (c) The cassette protective cover can be mounted on or dismounted from the tape cassette by one touch action and hence the single-handed operation is made possible (d) When the tape cassettes are taken out from the cassette receptacle containers and kept under being stacked up, a title can be attached to the front plate 8a of the cassette protective cover so that it is possible to recognize the content of the title from the front surface of the cassette protective cover. (e) Since no lid is provided on the rear surface of the cassette protective cover, it is possible to confirm the remaining amount of the tape in the tape cassette without removing the cassette protective cover. (f) When the tape cassette is carried under being attached with the cassette protective cover, the tape in the tape cassette does not get loose.

Figure 9:
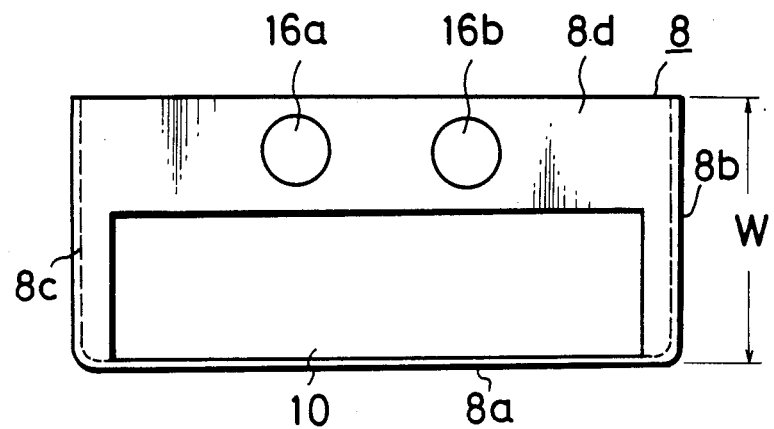
FIG. 9 is a plan view showing another embodiment of the cassette protective cover according to the present invention.
Figure 10:
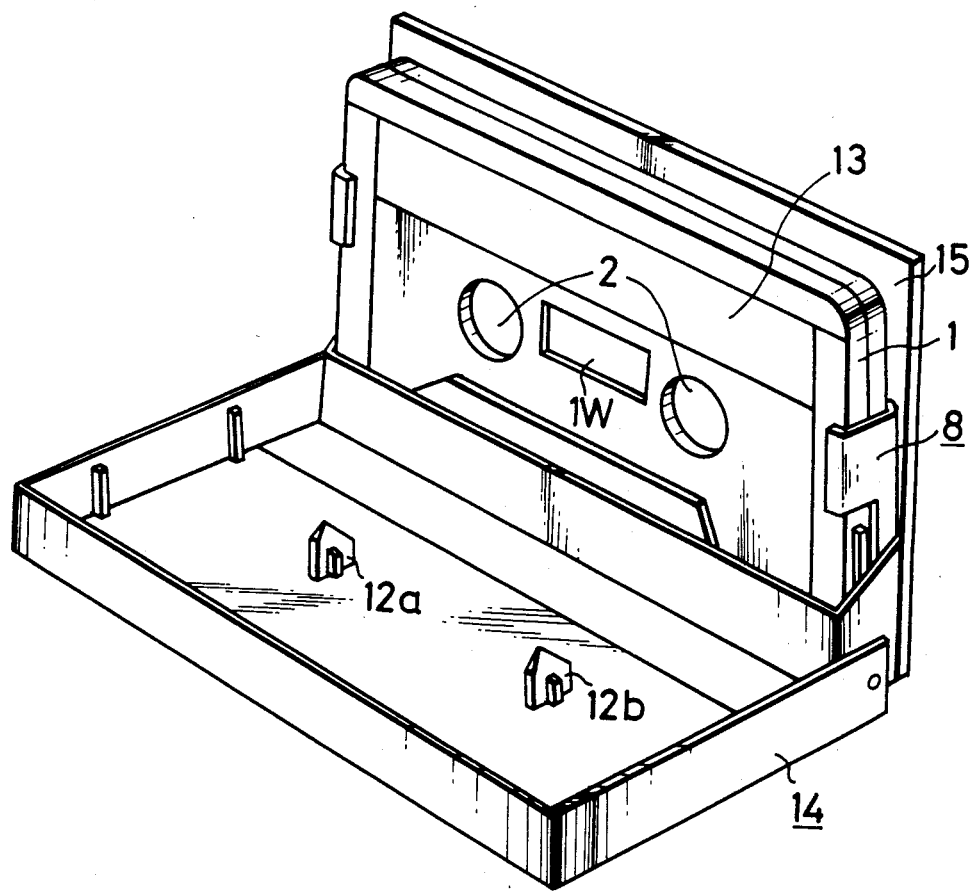
FIG. 10 is a perspective view illustrating a state in which the cassette protective cover of the present invention shown in FIG. 9 is attached to the similar tape cassette to that of FIG. 8 and inserted into the ordinary cassette receptacle container.

FIGS. 9 and 10 are respectively diagrams showing another embodiment of the cassette protective cover according to the present invention. In the cassette protective cover 8 shown in FIGS. 9 and 10, instead of the engaging members 12a, 12b formed on the upper plate or bridging member 8d of the cassette protective cover 8 so as to be engaged with the supply and take-up hubs of the tape cassette 1 as shown in FIGS. 2 to 6, apertures 16a, 16b are respectively formed through the upper plate 8d. The dimension of this cassette protective cover 8 is selected such that as shown in FIG. 10, the tape cassette 1, under being attached with the cassette protective cover 8, can be inserted into the lid 15 of the ordinary cassette receptacle container 14 disclosed in U.S. Pat. No. 3,272,325 which is provided with the engaging members 12a, 12b. In the cassette protective cover 8 of the present invention shown in FIGS. 9 and 10, the engaging members 12a, 12b formed on the cassette receptacle container 14 enables the tape, which is wound around the take-up and supply hubs, to be prevented from being slackened.

Figure 11:
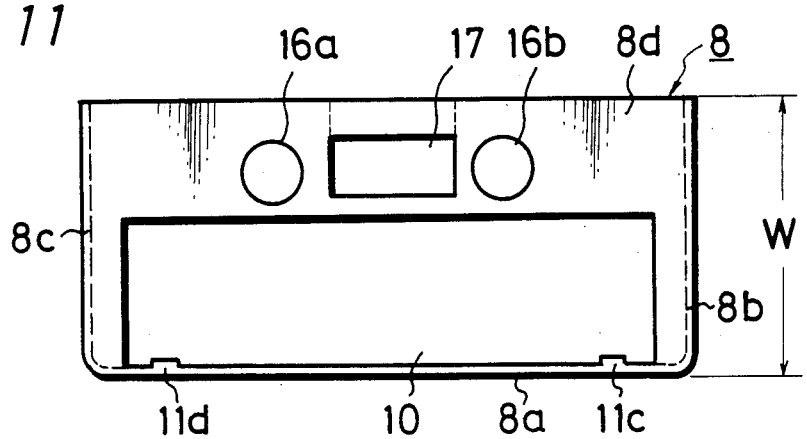
FIG. 11 is a plan view showing further embodiment of the cassette protective cover according to the present invention.

FIG. 11 is a diagram showing further embodiment of the cassette protective cover according to the present invention. In FIG. 11, reference numeral 17 designates a punched-out window which is formed through the bridging member 8d and through which the transparent window 1W of the tape cassette 1 (refer to FIGS. 8 and 10) can be observed. This window 17 may be cut away as shown by lines in FIG. 11.

In the above embodiments of the present invention, it is possible that the overall of the cassette protective cover 8 may be made of a transparent synthetic resin or only its bridging member 8d is made of transparent synthetic resin by two-color molding through which it is possible to check the remaining amount of the tape in the tape cassette 1 through the transparent window 1W.

Figure 12:
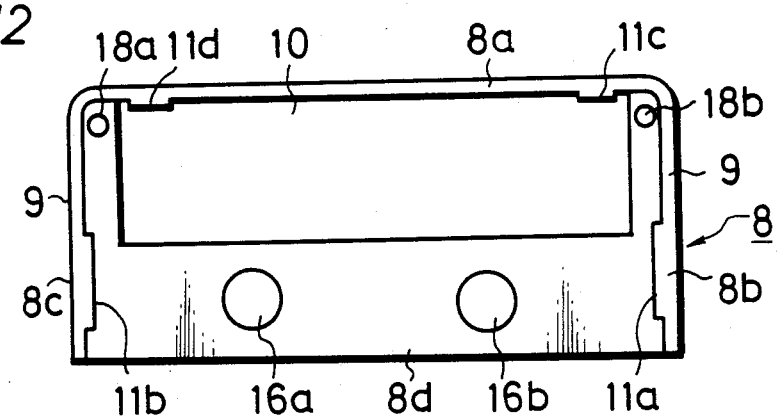
FIG. 12 is a bottom view showing further embodiment of the cassette protective cover according to the present invention.
Figure 13:
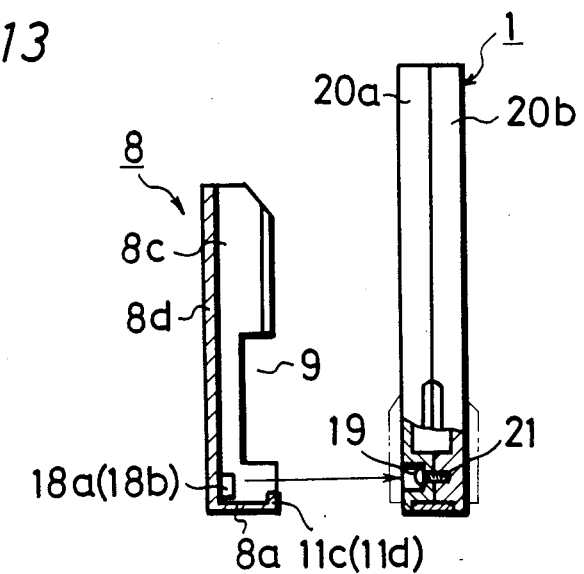
FIG. 13 is a partially cross-sectional side view showing a state in which the cassette protective cover of the present invention as shown in FIG. 12 is inserted into an ordinary cassette half.

FIGS. 12 and 13 respectively show further embodiment of the cassette protective cover 8 according to the present invention. FIG. 12 is a bottom view of the above example of the cassette protective cover 8 and FIG. 13 is a partially cross-sectional side view illustrating the state in which the cassette protective cover 8 of the example is mounted on the tape cassette 1. In FIGS. 12 and 13, like parts corresponding to those of FIGS. 2 and 3 are marked with the same references and will not be described in detail. As shown in FIG. 13, protruded portions 18a, 18b are formed on the inner surface of the bridging member 8d at two positions corresponding to screw apertures 19, 19 of the tape cassette 1 for assembling a pair of cassette halves. As shown in FIG. 13, the tape cassette 1 is generally formed on its side of surface A with the above screw apertures 19, 19 through which a cassette half 20a on the side of the surface A and another cassette half 20b on the side of the surface B are fastened together by screw bolts 21, 21. In this case, heads of the screw bolts 21 are located in the side of the surface A. Accordingly, when the cassette protective cover 8 of the present invention as shown in FIG. 12 is inserted into the tape cassette 1 from the side of the surface A, as shown in FIG. 13, the protruded portions 18a, 18b are engaged with the cassette half screw apertures 19, 19 formed on the side of the surface A of the tape cassette 1 so that the cassette protective cover 8 is firmly inserted into the tape cassette 1. However, when the cassette protective cover 8 is fitted into the tape cassette 1 from the cassette half 20b on the side of the surface B, there are provided no cassette half fastening screw apertures so that it is impossible to precisely engage the cassette protective cover 8 into the tape cassette 1.

Figure 14:
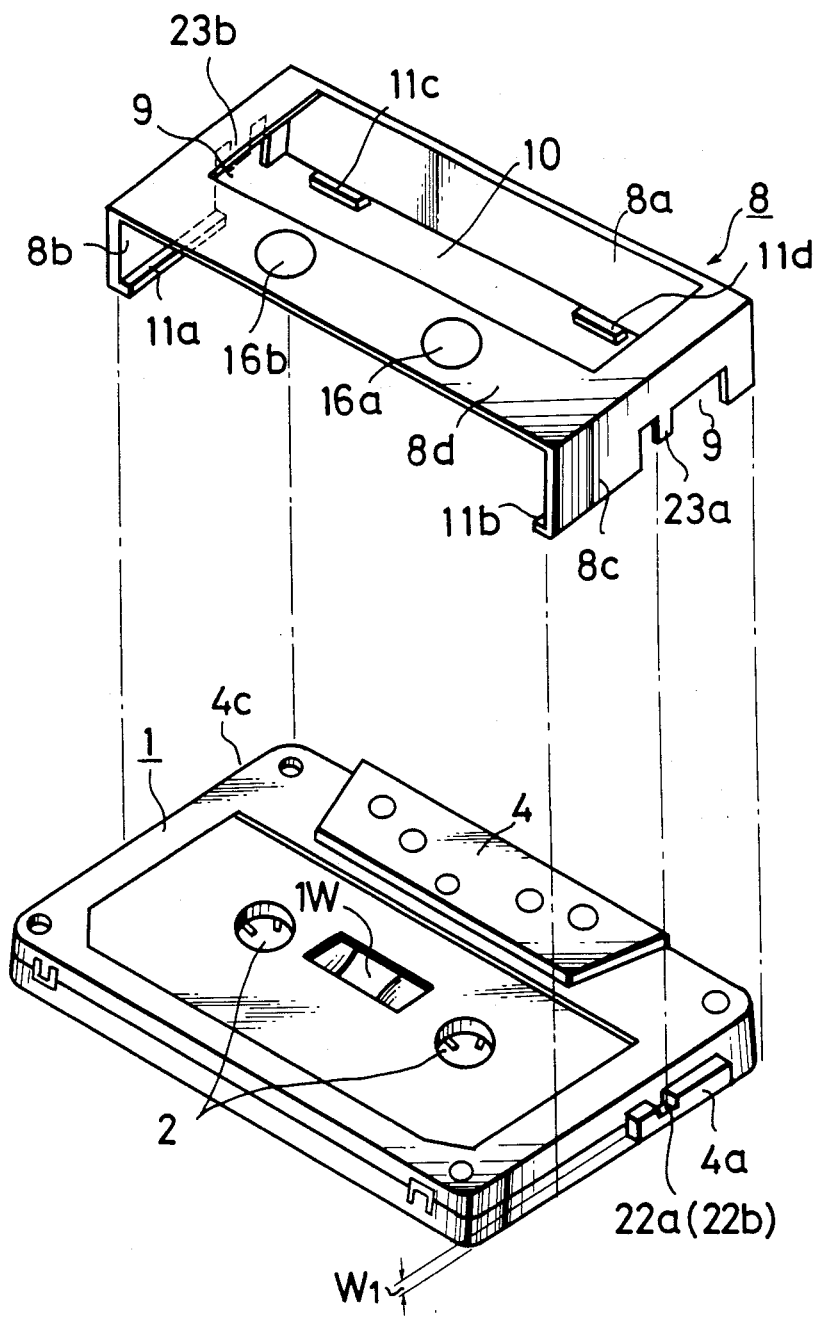
FIG. 14 is a perspective view showing further embodiment of a cassette protective cover and a tape cassette according to the present invention.

FIG. 14 is a perspective view illustrating further embodiment of the cassette protective cover 8 according to the present invention which can attain the same purpose as that of the cassette protective cover 8 shown in FIG. 13. As shown in FIG. 14, grooves 22a, 22b are formed in the swell portions 4a, 4a formed on the left and right side wall portions of the tape cassette 1 at the side A (or side B) in the direction perpendicular to the longitudinal direction of the swell portions 4a, 4a up to about one-half of width W1 of the swell portions. On the other hand, protruded portions 23a23b are respectively formed at the cut-away portions 9, 9 of the left and right side plate 8b, 8c of the cassette protective cover 8 so as to be engaged with the grooves 22a, 22b of the tape cassette 1. Thus, if the cassette protective cover 8 of the present invention is inserted into the tape cassette 1, in which the grooves 22a, 22b are formed on the swell portions 4a, 4a, from the side of the surface A, the protruded portions 23a, 23b are engaged with the grooves 22a, 22b formed on the swell portions 4a, 4b, thus the cassette protective cover 8 being firmly engaged with the tape cassette 1. On the other hand, if the cassette protective cover 8 is engaged with the tape cassette 1 from the side of the surface B, since there are provided no grooves in the swell portions 4a, 4b, the protruded portions 23a, 23b respectively collide with the swell portions 4a, 4a and thus the cassette protective cover 8 can not be inserted into the tape cassette 1 correctly.

Since the cassette protective cover of the present invention constructed as shown in FIGS. 12 to 14 is always inserted into the tape cassette from the side of surface A, when the tape cassette is played by a car stereo or the like, it is possible to always recognize the surface of the tape cassette having the cassette protective cover as the side A. Moreover, the cassette protective cover can be inserted into or released from the tape cassette just by one touch action, so that even a blind person can tell the side A from the side B at once, thus achieving effects such as the improvement of the operation property and so on.

FIGS. 15 to 18 respectively show a still further embodiment of the cassette protective cover according to the present invention.

Figure 15:
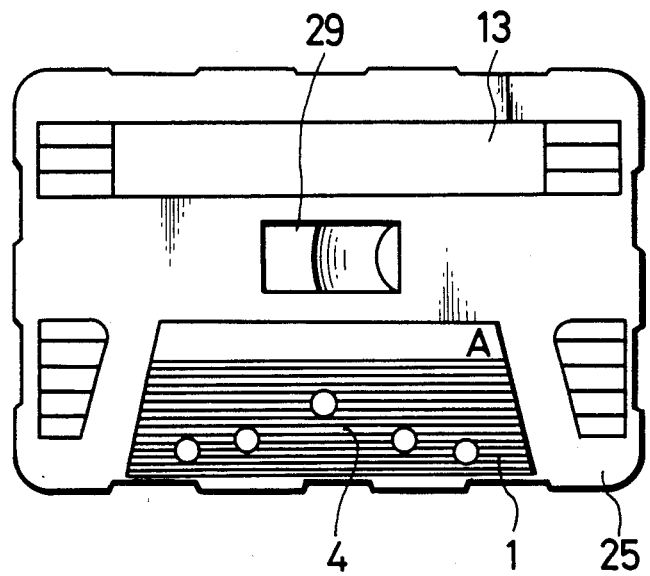
FIG. 15 is a plan view showing further embodiment of a cassette protective cover according to the present invention which is attached to a tape cassette.
Figure 16:
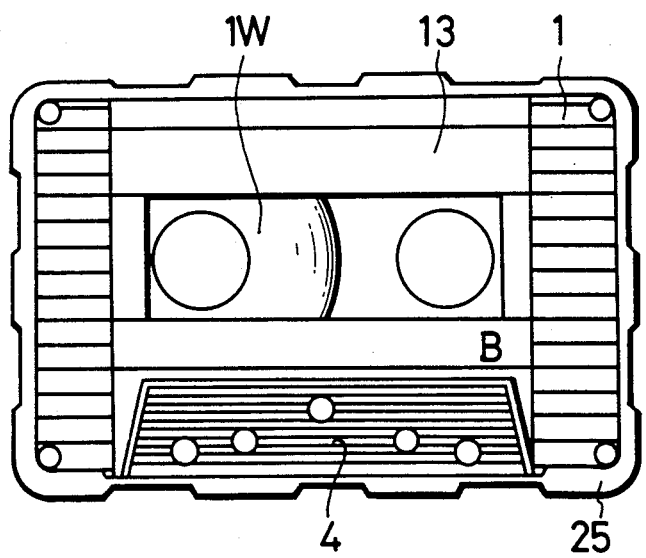
FIG. 16 is a bottom view thereof.

In FIGS. 15 and 16, reference numeral 1 generally designates a tape cartridge or tape cassette of a so-called reel-to-reel type (Phillips type). On each of the major plane, which is either side A or side B, of the tape cassette 1 are respectively formed a swell portion 4, a transparent window portion 1W to inspect therethrough the tape which is wound around a pair of hubs freely rotatable within the tape cassette 1 and a label attaching portion 13 and so on. Reference numeral 25 designates a cassette protective cover which is formed as substantially an unlidded box shape so as to cover either the side A or the side B of the tape cassette 1, while the side B or the side A of the tape cassette 1 is being exposed or opened. Further, the cassette protective cover 25 is so formed as to cover the front side connected to the swell portions 4 of the sides A and B and having opening window portions into which a magnetic head and the like are inserted, the rear side and the right and left sides of the tape cassette 1.

Figure 17:
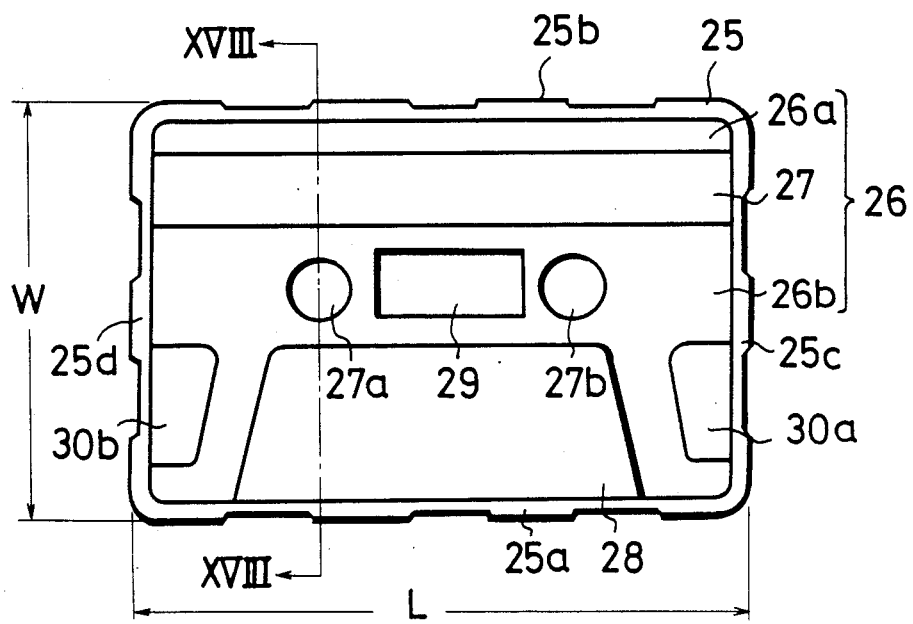
FIG. 17 is a plan view of the cassette protective cover according to the present invention.

As shown in FIG. 17, the cassette protective cover 25 made of, for example, resilient material such as urethane rubber and so on consists of a bottom portion 26, an upper wall portion 25b, a lower wall portion 25a, a left side wall portion 25d and a right side wall portion 25c which are all integrally assembled to be a box shape. At the same time, engaging piece members 27a, 27b are respectively formed on the bottom portion 26 so as to be engaged with the inner diameters of the pair of hubs of the tape cassette 1 so that the pair of hubs are prevented from being rotated. Through the bottom portion 26 are respectively formed opening portions 28, 27 and 29 to be capable of receiving swell portion 4, the label portion 13 and inspecting through the transparent window portion 24 the state of the tape wound around the hubs of the tape cassette 1. If necessary, opening portions 30a, 30b are properly formed through the bottom portion 26. Reference numerals 26a, 26b respectively denote remaining portions of the bottom portion 26.

Figure 18:
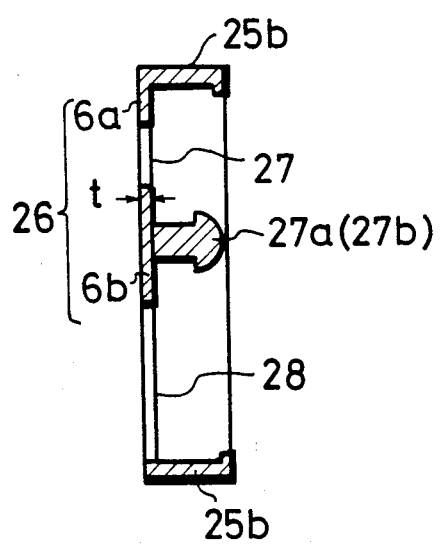
FIG. 18 is a cross-sectional diagram thereof taken along a line XVIII to XVII in FIG. 17.

As shown in FIG. 18, the thickness t of the bottom portion 26 of the cassette protective cover 25 is selected to be substantially equal to or smaller than the height of the swell portion 4 of the tape cassette 1. While, the length L and the width W of the cassette protective cover 25 as shown in FIG. 17 are respectively selected such that the cassette protective cover 25 can be inserted into the cassette receptacle container disclosed in U.S. Pat. No. 3,272,325. In the last-mentioned embodiment of this invention, in general, the inside dimension of the cassette protective cover 25 are respectively formed a little smaller than the outer dimentsion of the tape cassette 1 and the cassette protective cover 25 made of rubber and so on can be closely and firmly inserted into the tape cassette 1 under the condition that the right, left, upper and lower side walls of the cassette protective cover 25 are expanded and then contacted with the respective side walls of the tape cassette 1 by utilizing the resiliency of the rubber and so on.

While in the above embodiment shown in FIGS. 15 to 18, the opening 29 for the transparent window 24 and the opening 27 for inspecting the label are respectively formed, it is clear that these openings 29 and 27 can be formed if necessary. Also it is clear that it is not always necessary to provide the engaging piece members 27a, 27b for the hubs. Further, it may be apparent that the cassette protective covers as shown in FIGS. 2 to 14 can be made of resilient material.

Since the cassette protective cover of the present invention as shown in FIGS. 15 to 18 is constructed as set forth above, it is possible also to insert the tape cassette attached with the cassette protective cover of this embodiment into the ordinary cassette receptacle container, while when the musical program is enjoyed with the tape cassette, only the tape cassette attached with the cassette protective cover can be taken out from the cassette receptacle container and then carried in, for example, the breast pocket and so on. In this case, the tape cassette can be inserted into the breast pocket compactly and smoothly but is difficult to be dropped out from the breast pocket. In addition, it is possible to prevent the surface of the tape from being damaged and to prevent the tape from being slackened. Further, when the tape cassette attached with the cassette protective cover is accidentally dropped out, the tape cassette can be prevented from being damaged by the cushion effect of the resilient material which forms the cassette protective cover, resulting in a great practical effect.

The above description is given on the preferred embodiments of the invention, but it will be apparent that many modifications and variations could be effected by one skilled in the art without departing from the spirits of scope of the novel concepts of the invention, so that the scope of the invention should be determined by the appended claims only.

We claim as our invention:
1. A protective coveer for a magnetic tape cassette having a parallelepiped body formed of a pair of planar walls, a pair of short side walls and a pair of long side walls, one of the long side walls having an opening for the exposure of the magnetic tape, each of the planar walls having enlargements raised from the surface thereof centrally between the side walls and adjacent the opening in the one long side wall to define therewith means for the positioning therein of the playback and record head, and each of the short side walls having projections raised from the surface thereof adjacent the one long side wall to define means for positioning said cassette with respect to the playback and record head, said protective cover comprising a shell having a rectilinear member for covering the front wall, the rear wall and the right and left side walls of said tape cassette; and a lid member substantially coextensive with said rectilinear member and integrally formed with said rectilinear member, for covering at least one major planar surface of said tape cassette, said shell being formed of elastic sheet material stretchable over one of the planar walls of said cassette and about the peripheral front, rear, and side walls, said sheet material having a thickness and inside dimension slightly than those of the cassette wherein the total thickness of said cassette and shell when said shell is positioned over said cassettte is substantially the same as the thickness of the cassette at the raised enlargements and the overall length is substantially the same as the overall distance between the projection on each of said short side walls of said cassette.

2. The protective cover according to claim 1, wherein said tape cassette is provided with one or more recesses on one planar surface and said lid member is provided with projecting means for engagaing in said recesses such that said cassette can be inserted into said protective cover only in one position.

3. The protective cover acccording to claim 1 including engaging members formed integrally with said lid member to prevent said hubs within said tape cassette from being rotated.

4. The protective cover according to claim 1 wherein a window portion is formed through said lid member through which the transparent window portion of said tape cassette is formed.

5. The protective cover according to claim 1 wherein said rectilinear and lid members are so selected and dimensioned that said tape cassette with said cassette protective cover can be inserted together into a standard cassette receptacle container.

6. A protective cover for a magnetic tape cassette having a parallelepiped body formed of a pair of planar walls, a pair of short side walls and a pair of long side walls, one of said long side walls having an opening for the exposure of the magnetic tape, each of said planar walls having enlargements raised from the surface thereof centrally between said side walls and adjacent the opening in said one long side wall to define therewith means for positioning therein of the playback and record head, and each of said short side walls having projections raised from the surface thereof adjacent said one long side wall to define means for positioning said cassette with respect to the playback and record head, said protective cover comprising, a shell having a planar base plate and a U-shaped peripheral wall extending upwardly therefrom along the edges thereof, said U-shaped peripheral wall having a front section conforming in length to said one long side wall of said cassette and a pair of side sections, each having a length less than the short side walls of said cassette, said base plate extending from the front section of said peripheral wall a distance less than the length of the short side walls of said cassette to permit exposure of the label portion of said cassette, said base member having a first cutout adjacent the front section for receiving the raised enlargement on one planar surface of said tape cassette, each of said side sections having a second cutout adjacent the front section for respectively receiving the projecting members on the short side walls of said cassette tape, and tab means projecting inwardly from the front and side sections of said U-shaped member along the edges thereof opposite the base to engage the rear of the other planar surface of said tape cassette, said tabs on said front sections being spaced from and straddling the central enlargements raised from the planar walls of said cassette, said shell having a thickness and dimension wherein the total thickness of said cassette and shell is substantially the same as the thickness of the cassette at the raised engagements and an overall length substantically the same as the overall distance between the projection on each of said short side walls of said cassette.

7. The protective cover according to claim 6, wherein said base member is formed with a window or cut-away portion to inspect therethrough the tape winding state within a transparent window portion of said tape cassette.

8. A cassette protective cover according to claim 7, wherein said base member is made of at least transparent material.

9. The protective cover according to claim 6, wherein said tape cassette is provided with one or more recesses on at least one of its side walls, said U-shape member being provided with means for engaging said recesses whereby said cassette can be inserted into said protective cover only in one position.

* * * * *